(12) United States Patent
Strobbel et al.

(10) Patent No.: US 6,610,258 B1
(45) Date of Patent: Aug. 26, 2003

(54) DEVICE FOR PURIFYING FLUID WITH PHOTONIC PULSES

(76) Inventors: Nicolas Strobbel, 100 rue Sylvabelle, 13006 Marseilles (FR); Stephane Marty, 150 rue Sainte, 13007 Marseilles (FR); Alphonse Graffeo, Touret de Vailler 7 Impasse Leo Delibes, 13500 Martigues (FR); Jean-Claude Gueraud, 429 rue Paradis, 13008 Marseilles (FR)

( * ) Notice: Subject to any disclaimer, the term of this patent is extended or adjusted under 35 U.S.C. 154(b) by 0 days.

(21) Appl. No.: 09/807,928
(22) PCT Filed: Oct. 19, 1999
(86) PCT No.: PCT/FR99/02545
§ 371 (c)(1), (2), (4) Date: Jul. 9, 2001
(87) PCT Pub. No.: WO00/23381
PCT Pub. Date: Apr. 27, 2000

(30) Foreign Application Priority Data

Oct. 20, 1998 (FR) .............................. 98 13386

(51) Int. Cl.[7] .................................................. B01J 19/08
(52) U.S. Cl. ..................................................... 422/186.3
(58) Field of Search ..................................... 422/186.3

(56) References Cited

U.S. PATENT DOCUMENTS

| | | |
|---|---|---|
| 2,072,417 A | 3/1937 | Berndt et al. |
| 2,636,991 A | 4/1953 | Postell |
| 3,565,777 A | 2/1971 | Lauer |
| 3,676,318 A | 7/1972 | Lauer |
| 3,817,703 A | 6/1974 | Atwood |
| 3,941,670 A | 3/1976 | Pratt, Jr. |
| 4,443,533 A | 4/1984 | Panico |
| 4,495,040 A | 1/1985 | Panico |
| 5,874,741 A * | 2/1999 | Matschke ................ 422/186.3 |

FOREIGN PATENT DOCUMENTS

| | | |
|---|---|---|
| FR | 2482459 | 5/1981 |
| GB | 5635 | 1/1913 |
| WO | 84/00506 | 2/1984 |

* cited by examiner

Primary Examiner—Kishor Mayekar
(74) Attorney, Agent, or Firm—Greenblum & Bernstein, P.L.C.

(57) ABSTRACT

Device for purifying a fluid with photonic pulses includes a quartz tube adapted to allow the fluid to flow therethrough. A helical pulse xenon lamp is mounted concentrically about the quartz tube. The helical pulse xenon lamp emits a photonic radiation ranging from a low ultraviolet to an unbroken infrared. A chamber encloses the helical pulse xenon lamp and comprises wavelength reflecting inner walls. A duration of each flash emitted by the helical pulse xenon lamp is between 100 microseconds and 100 milliseconds.

21 Claims, 2 Drawing Sheets

DEVICE FOR PURIFYING FLUID WITH PHOTONIC PULSES

CROSS-REFERENCE TO RELATED APPLICATIONS

The present application is a National Stage Application of International Application No. PCT/FR99/02545, filed Oct. 19, 1999. Further, the present application claims priority under 35 U.S.C. § 119 of French Patent Application No. 98/13386 filed on Oct. 20, 1998.

BACKGROUND OF THE INVENTION

1. Field of the Invention

The present invention relates to a device for purifying a fluid with photonic pulses.

The invention is particularly adapted for treating water in general, water for a distribution system, waste water or drinking water, as well as water stored in reservoirs or tanks such as those used in fish farming. However, the treated fluid can also be a gas, such as air, or a liquid other than water.

2. Discussion of Background Information

The chemical or organic pollutants present in a fluid can be eliminated through purification, either by passive processes, such as filtering, or by active processes using technologies aimed at transforming the pollutants into neutral products.

Four distinct major families of active processes can be distinguished:
1. Chemical processes consisting of an addition of compounds to fix the pollutants (water chlorination, for example);
2. Thermal processes, which involve pasteurization requiring a predetermined exposure time at a given temperature and pressure;
3. Organic processes, characterized by the use, in the polluted medium, of organisms producing a digestion of the pollutants; and
4. Photonic processes based on the photo-biologic effects of light, including visible light (380–780 nanometers), near ultraviolet light (300–380 nm) and deep ultraviolet light (190–300 nm).

Photonic processes have been studied for years, and efforts have been made to apply this physico-chemical principle to the purification or sterilization of water or other targets. For example, U.S. Pat. No. 3,676,318 relates to a process and apparatus for cleaning stack gases, adapted particularly to remove the sulfur dioxide, the process consisting of pulverizing electrically charged droplets of water in the gas before subjecting the latter to an ultraviolet radiation by passing it in a quartz tube outside of which a xenon flash lamp is arranged, surrounded by an aluminum reflector. U.S. Pat. No. 2,072,417 describes the irradiation of substances, such as milk, with active rays such as UV rays. U.S. Pat. No. 3,817,703 describes the sterilization of a material by means of a pulsed laser light. U.S. Pat. No. 3,941,670 discloses a method for sterilizing materials, as well as food products, by exposing them to a laser radiation to deactivate the microorganisms. French Patent No. FR 2 482 459 relates to a system for sterilizing thick layers of "aspergillus niger" using a "flash" lamp containing a rare gas emitting intensely in the range of ultraviolet radiations. This method has proven more efficient than those using a continuous emission sterilizing lamp such as a mercury-vapor lamp.

However, these techniques have shortcomings, in particular, a limited output capacity, an inefficient energy conversion (from electricity to light), and a non-optimum photonic coupling of the useful portion of the light to the target.

SUMMARY OF THE INVENTION

The present invention therefore provides a device for purifying a fluid which makes it possible to obtain substantial gains on the consumption of power efficiency, and to pass substantial outputs in a very compact device.

Accordingly, the invention utilizes a helical pulse xenon lamp having one or several turns emitting a photonic radiation ranging from low ultraviolet to unbroken infrared. The lamp is mounted on a cylindrical quartz tube through which passes the fluid to be treated. The lamp can also be associated with a longitudinal lamp of the same type but that is immersed in the center of the tube. This assembly can be arranged in a chamber whose inner walls reflect the ultraviolet radiations.

The invention also provides for a device for purifying a fluid with photonic pulses, comprising a quartz tube adapted to allow the fluid to flow therethrough. An irradiation source is mounted concentrically to the quartz tube. A chamber comprising inner walls is provided which promotes reflection of wavelengths. The irradiation source emits a photonic radiation ranging from a low ultraviolet to an unbroken infrared. An electrical morphology of the current pulse generating a flash of the irradiation source enables an output between 2% and 15% in a germicidal spectrum centered on the wavelength of 257 nanometers. A duration of each flash emitted by the irradiation source is between 100 microseconds and 100 milliseconds.

The fluid may comprise water. The fluid may also comprise at least one of a fluid other than water and a gas. The irradiation source may comprise a helical pulse xenon flash lamp mounted on the quartz tube. The helical pulse xenon flash lamp may have at least one turn. The wavelengths may be in the ultraviolet radiation range. The device may further comprise another irradiation source positioned within the quartz tube. The other irradiation source may comprise a pulse xenon flash lamp. The irradiation source and the quartz tube may each be disposed within the chamber.

The quartz tube may further comprise an enlarged cylindrical chamber whose diameter is larger than a diameter of the quartz tube. The enlarged cylindrical chamber may comprise a main inlet and an outlet, whereby the fluid is adapted to travel from a center of the enlarged cylindrical chamber outwardly. Each of the main inlet and the outlet may comprise a plurality of holes adapted to promote turbulence of the fluid. The quartz tube may further comprise an inner enlarged cylindrical chamber whose diameter is larger than a diameter of the quartz tube and an outer enlarged cylindrical chamber surrounding the inner enlarged cylindrical chamber. The irradiation source may be arranged in a cylindrical space formed by the outer enlarged cylindrical chamber and the inner enlarged cylindrical chamber.

The chamber may be made of pure aluminum. The chamber may comprise a layer of oxide which has an ultraviolet ray reflection ratio close to 80%. The device may further comprise a UV diode sensor disposed inside the chamber. The UV diode sensor may be integrated in a wall of the chamber. The UV diode sensor may enable control of the irradiation source aging. The device may further comprise an immersed helix disposed inside the quartz tube, whereby the helix is adapted to render a flow of the fluid cyclonic and turbulent.

The invention also provides a device for purifying a fluid with photonic pulses, comprising a quartz tube adapted to allow the fluid to flow therethrough. A helical pulse xenon lamp is mounted concentrically about the quartz tube. The helical pulse xenon lamp emits a photonic radiation ranging from a low ultraviolet to an unbroken infrared. A chamber encloses the helical pulse xenon lamp and comprises wavelength reflecting inner walls. A duration of each flash emitted by the helical pulse xenon lamp is between 100 microseconds and 100 milliseconds.

The invention also provides a device for purifying a fluid with photonic pulses, comprising a quartz tube adapted to allow the fluid to flow therethrough. A helical pulse xenon lamp is mounted concentrically about the quartz tube. The helical pulse xenon lamp emits a photonic radiation ranging from a low ultraviolet to an unbroken infrared. A chamber encloses the helical pulse xenon lamp and comprises wavelength reflecting inner walls. A longitudinal pulse xenon lamp is mounted within the quartz tube. A power supply is coupled to each of the helical pulse xenon lamp and the longitudinal pulse xenon lamp.

BRIEF DESCRIPTION OF THE DRAWINGS

In the annexed schematic drawings, provided by way of non-limiting examples of embodiments of the invention.

DETAILED DESCRIPTION OF THE INVENTION

Figure 1:
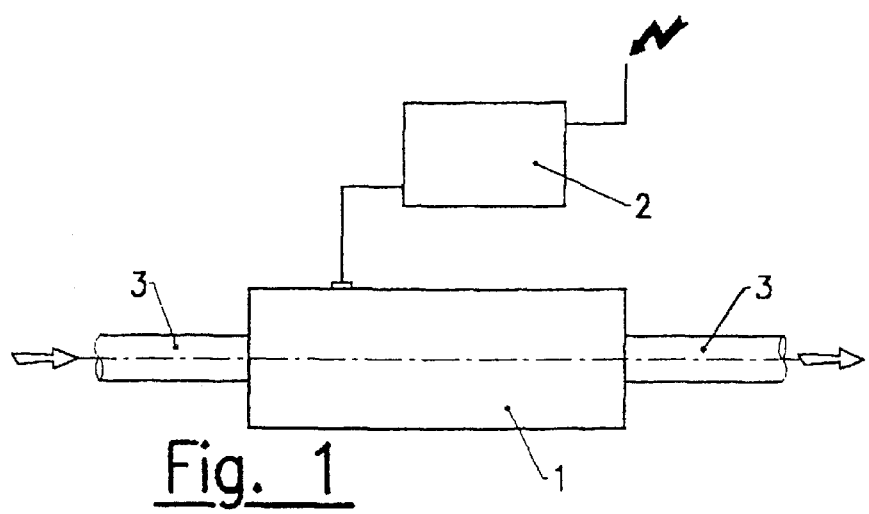
FIG. 1 shows the system of the invention in its entirety.
Figure 2:
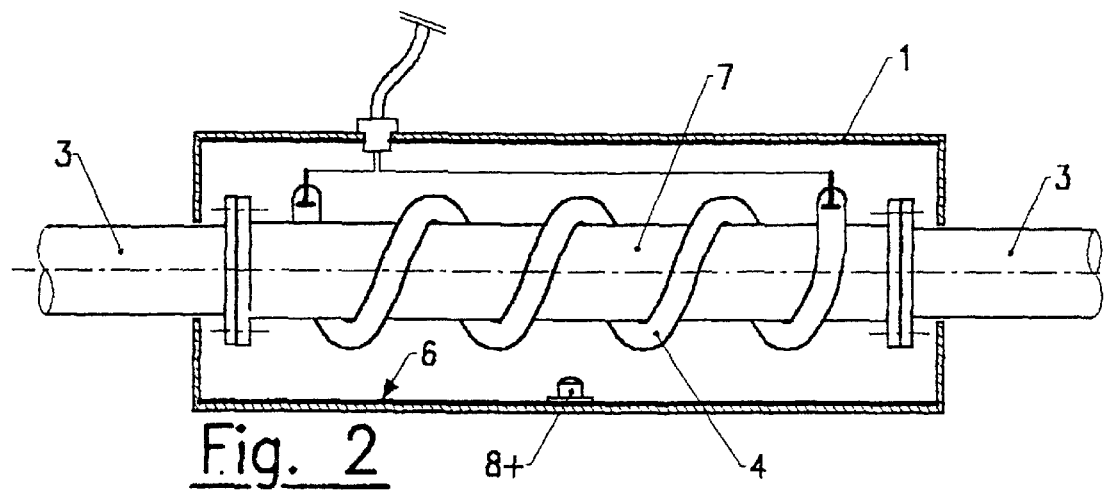
FIG. 2 shows an enlarged axial cross-section of the chamber shown in FIG. 1.
Figure 3:
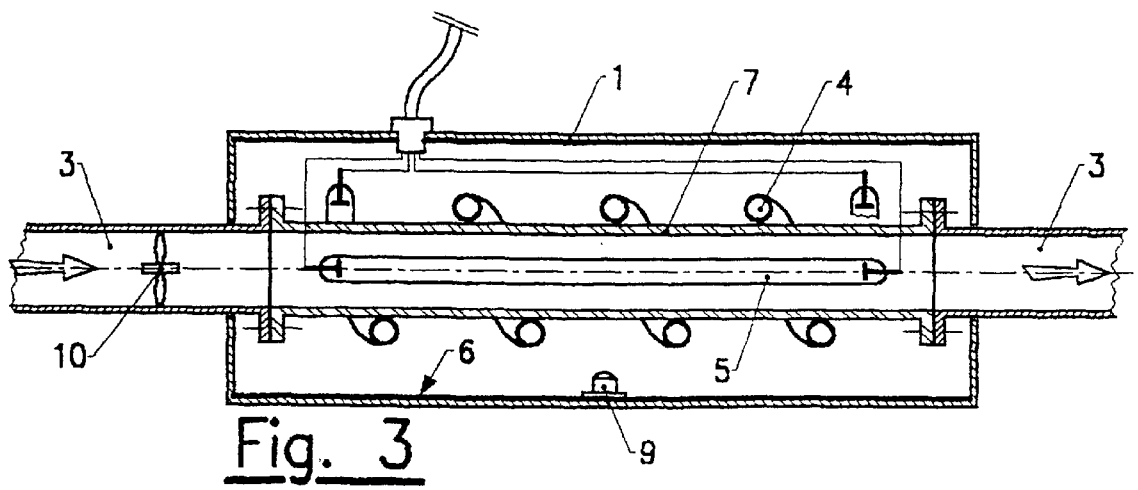
FIG. 3 shows an alternative embodiment of the invention which uses an immersed irradiating lamp and a helix adapted to render cyclonic the flow of the treated fluid.

The system or device, as shown in FIGS. 1–3, is constituted of a chamber 1 forming a treatment cell, and of a power supply module 2.

The chamber 1 is crossed by a channel 3 in which the fluid to be treated passes, and contains irradiating lamp(s) 4, 5. This chamber 1 is preferably a cylindrical chamber which is constituted, or coated on an inner surface 6 of its wall, with a material of the type promoting the reflection of the wavelength range comprised in the range of ultraviolet radiations (UV). Advantageously, this coating can be a pure aluminum, whose oxide layer has a UV reflection ratio close to 80%.

The photonic radiation is obtained by way of at least one concentric irradiation helical lamp 4 mounted on a cylindrical tube 7 in which the target fluid passes, and which is made of transparent quartz. In this way, wavelengths desired for the intended treatment are allowed to pass therethrough and treat the fluid in the tube 7. This principle enables substantial gains in the consumption of power efficiency, and makes it possible to pass substantial outputs in a very compact device.

The principle of concentric irradiation offered by the helical arrangement of the lamp(s) 4 enables any options in terms of photonic coupling. Indeed, it is possible, depending on the extinction coefficient due to the radiation absorption by the target fluid, to compensate for the loss by a supplemental irradiation provided by a complementary lamp 5 immersed in the center of the quartz tube 7. This eccentric emission lamp then enables an increase of about 65% in the admissible output at an equal treatment (thickness of the fluid traversed increased by about 30%).

Figure 4:
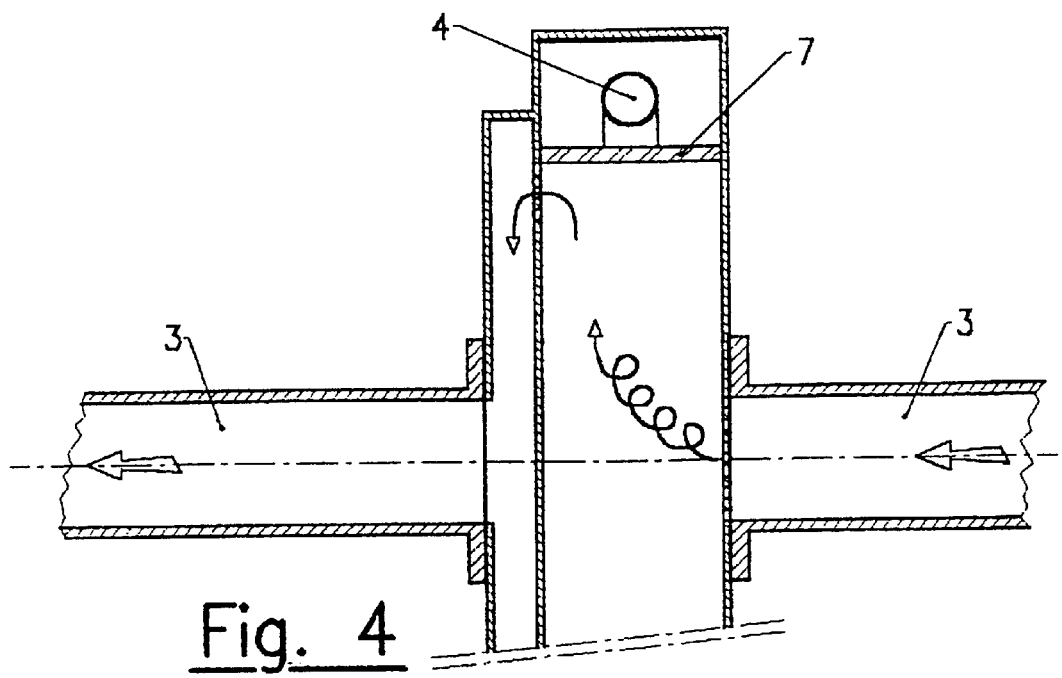
FIGS. 4 and 5 show longitudinal cross-sections of two alternative embodiments of tubes for the passage of the fluid.

In FIG. 4, the tube 7 for the passage of the fluid is in the form of a short section with a large diameter compared to that of the channel 3. This configuration makes it possible to slow the fluid substantially due to the large section of the treatment zone without requiring a lamp 4 to be very long. This lamp is thus advantageously capable of having a single turn. The major interest of this configuration is to increase the time of exposure of a unitary volume of fluid to the photonic irradiation. The tube 7 comprises a main inlet and peripheral outlets such that the travel of the fluid occurs from the center outward, therefore from the highest surface energies toward the lowest, at the periphery. The equivalent inlet and outlet sections are constituted of a multitude of holes promoting the turbulence and control of the average travel of each elementary fluid volume.

Figure 5:
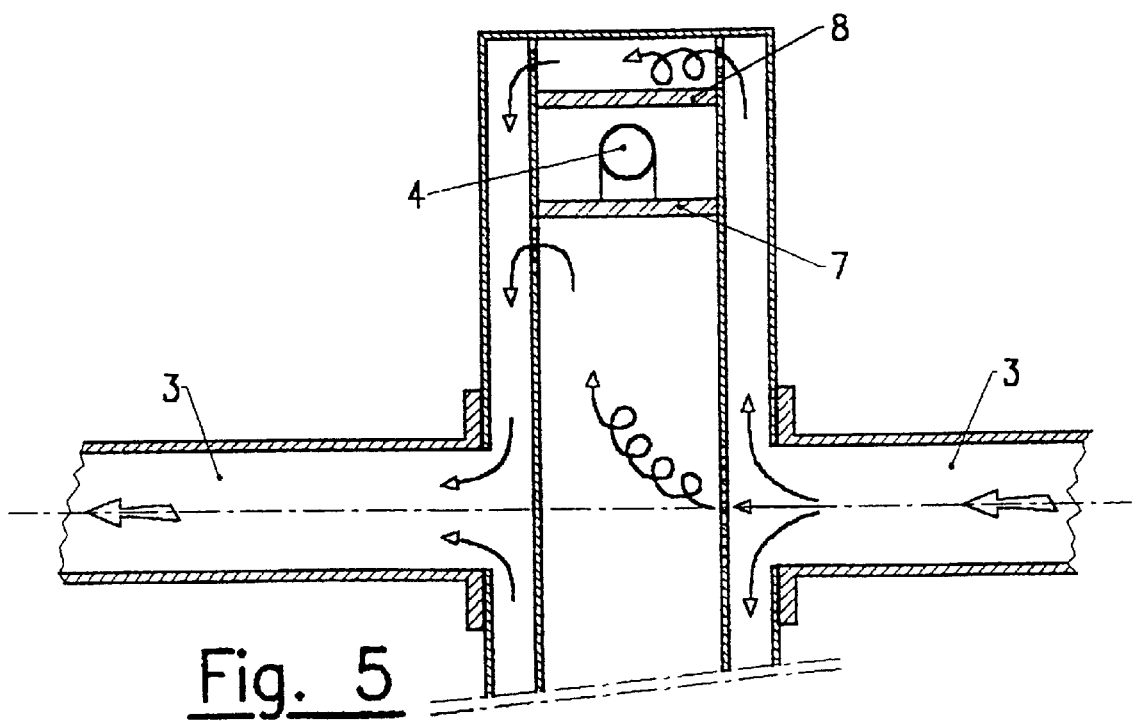

In addition to the central tube 7, the device can comprise a peripheral tube 8 for the passage of the fluid, outside the lamp 4, and whose role is to enable an increase in the passage section on the order of 25% and, therefore, an increase in the output of about 50% (FIG. 5).

The lamp or lamps 4, 5 are Xenon "flash" lamps emitting a pulse light spread over a spectrum ranging from the low to the visible UV, and offering an extremely favorable output in the energy conversion from electric current to light. The purifying effect is then obtained by the LW emission (germicide) completed by the visible energy density generating a shockwave related to the expansion of the photonic discharge. The concentration of this flash for a duration ranging from 100 microseconds to 100 milliseconds offers a photonic energy density making it possible to cross a layer of fluid compatible with the outputs to be treated, on the one hand, and with their content of solid particles in suspension defined as being an average turbidity.

The electric morphology of the current pulse generating each flash is such that it enables an output between 2 and 15% in the so-called germicidal spectrum, which is the DNA absorption spectrum centered on the wavelength of 257 nanometers.

During the generation of the current pulse, values, such as the characteristic impedance of the lamp as a significant aging or failure value, are systematically measured and controlled. This information can be exploited as any signal provided to an external automatic machine. The control of the aging of the lamp(s) can be completed by a UV diode type sensor 9 integrated in the wall of the chamber 1.

In the case of a peripheral lamp 4 having several turns, the latter can advantageously comprise a helix 10 immersed in the inlet conduit, so that the flow traversing the purifying device is rendered cyclonic. This gyration effect of the turbulent flow in the cell increases the treatment efficiency, because it can then be considered that any target particle passes at least once as close to the lamp(s) as possible, and that the average travel of an elementary volume is substantially prolonged, thus increasing the exposure time and promoting the integrated dose of radiation.

The positioning of the various constituent elements provides the object of the invention with a maximum of useful effects which had not been, to date, obtained by similar devices.

What is claimed is:

1. A device for purifying a fluid with photonic pulses, comprising:

a quartz tube adapted to allow the fluid to flow therethrough;

an irradiation source mounted concentrically to the quartz tube;

another irradiation source positioned within the quartz tube;

a chamber comprising inner walls which promote reflection of wavelengths;

the irradiation source configured to emit a photonic radiation ranging from a low ultraviolet to an unbroken infrared;

said device configured such that an electrical morphology of a current pulse generates a flash of the irradiation source enabling an output between 2 and 15% in a germicidal spectrum centered on the wavelength of 257 nanometers; and a duration of each flash emitted by the irradiation source being between 100 microseconds and 100 milliseconds.

2. The device of claim 1, wherein the fluid comprises water.

3. The device of claim 1, wherein the fluid comprises at least one of a fluid other than water and a gas.

4. The device of claim 1, wherein the irradiation source comprises a helical pulse xenon flash lamp mounted on the quartz tube.

5. The device of claim 4, wherein the helical pulse xenon flash lamp has at least one turn.

6. The device of claim 1, wherein the wavelengths are in the ultraviolet radiation range.

7. The device of claim 1, wherein the another irradiation source comprises a pulse xenon flash lamp.

8. The device of claim 1, wherein the irradiation source and the quartz tube are disposed within the chamber.

9. The device of claim 1, wherein the quartz tube further comprises an inner enlarged cylindrical chamber whose diameter is larger than a diameter of the quartz tube and an outer enlarged cylindrical chamber surrounding the inner enlarged cylindrical chamber.

10. The device of claim 9, wherein the irradiation source is arranged in a cylindrical space formed by the outer enlarged cylindrical chamber and the inner enlarged cylindrical chamber.

11. The device of claim 1, wherein the chamber is made of pure aluminum.

12. The device of claim 1, wherein the chamber comprises a layer of oxide which has an ultraviolet ray reflection ratio close to 80%.

13. The device of claim 1, further comprising a UV diode sensor disposed inside the chamber.

14. The device of claim 13, wherein the UV diode sensor is integrated in a wall of the chamber.

15. The device of claim 14, wherein the UV diode sensor enables control of the irradiation source aging.

16. The device of claim 1, further comprising an immersed helix disposed inside the quartz tube, wherein the helix is adapted to render a flow of the fluid cyclonic and turbulent.

17. A device for purifying a fluid with photonic pulses, comprising:

a quartz tube adapted to allow the fluid to flow therethrough;

a helical pulse xenon lamp mounted concentrically about the quartz tube;

the helical pulse xenon lamp configured to emit a photonic radiation ranging from a low ultraviolet to an unbroken infrared;

a chamber enclosing the helical pulse xenon lamp and comprising wavelength reflecting inner walls; and a duration of each flash emitted by the helical pulse xenon lamp being between 100 microseconds and 100 milliseconds.

18. A device for purifying a fluid with photonic pulses, comprising:

a quartz tube adapted to allow the fluid to flow therethrough;

a helical pulse xenon lamp mounted concentrically about the quartz tube;

the helical pulse xenon lamp configured to emit a photonic radiation ranging from a low ultraviolet to an unbroken infrared;

a chamber enclosing the helical pulse xenon lamp and comprising wavelength reflecting inner walls;

a longitudinal pulse xenon lamp mounted within the quartz tube; and a power supply coupled to each of the helical pulse xenon lamp and the longitudinal pulse xenon lamp.

19. A device for purifying a fluid with photonic pulses, comprising:

a quartz tube adapted to allow the fluid to flow therethrough, the quartz tube comprising an enlarged cylindrical chamber whose diameter is larger than a diameter of the quartz tube;

an irradiation source mounted concentrically to the quartz tube;

chamber comprising inner walls which promote reflection of wavelengths;

the irradiation source configured to emit a photonic radiation ranging from a low ultraviolet to an unbroken infrared;

said device configured such that an electrical morphology of a current pulse generates a flash of the irradiation source enabling an output between 2 and 15% in a germicidal spectrum centered on the wavelength of 257 nanometers; and a duration of each flash emitted by the irradiation source being between 100 microseconds and 100 milliseconds.

20. The device of claim 19, wherein the enlarged cylindrical chamber comprises a main inlet and an outlet, wherein the fluid is adapted to travel from a center of the enlarged cylindrical chamber outwardly.

21. The device of claim 20, wherein each of the main inlet and the outlet comprises a plurality of holes adapted to promote turbulence of the fluid.

* * * * *